US 6,691,670 B1

(12) United States Patent
Gatellier et al.

(10) Patent No.: US 6,691,670 B1
(45) Date of Patent: Feb. 17, 2004

(54) METHOD AND ENGINE PROVIDING MIXING OF AT LEAST ONE GASEOUS FLUID SUCH AS AIR AND OF A FUEL IN THE COMBUSTION CHAMBER OF A DIRECT-INJECTION INTERNAL-COMBUSTION ENGINE

(75) Inventors: Bertrand Gatellier, Bougival (FR); Bruno Walter, La Garenne Colombes (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/373,756

(22) Filed: Feb. 27, 2003

(30) Foreign Application Priority Data

Mar. 1, 2002 (FR) .............................. 02 02597

(51) Int. Cl.$^7$ .............................. F02B 31/00; F02B 1/12
(52) U.S. Cl. ..................... 123/298; 123/301; 123/305
(58) Field of Search ................ 123/298, 301, 123/305

(56) References Cited

U.S. PATENT DOCUMENTS

| | | | |
|---|---|---|---|
| 4,446,830 A | 5/1984 | Simko | |
| 4,473,046 A | 9/1984 | Aoyama et al. | |
| 4,858,578 A | 8/1989 | Schereer et al. | |
| 5,373,820 A | 12/1994 | Sakamoto | |
| 5,875,743 A | 3/1999 | Dickey | |
| 5,906,183 A | 5/1999 | Echtle et al. | |
| 6,098,588 A * | 8/2000 | Hufnagel | 123/261 |
| 6,345,601 B1 * | 2/2002 | Miyajima et al. | 123/305 |
| 6,516,774 B2 * | 2/2003 | zur Loye et al. | 123/299 |
| 2003/0005907 A1 * | 1/2003 | Nakakita et al. | 123/295 |

FOREIGN PATENT DOCUMENTS

DE 1055873 4/1959

OTHER PUBLICATIONS

Patent Abstracts of Japan vol. 015, No. 374 (M–1160) Sep. 20, 1991 & JP 03 149315 (Yanmar Diesel Engine Co. Ltd) Jun. 25, 1991.

* cited by examiner

Primary Examiner—Erick Solis
(74) Attorney, Agent, or Firm—Antonelli, Terry, Stout & Kraus, LLP

(57) ABSTRACT

The invention relates to a method providing mixing of at least one gaseous fluid in the combustion chamber of a direct-injection internal-combustion engine comprising at least a cylinder (10), a cylinder head (12), a piston (22) sliding in this cylinder, a fuel-injection nozzle (24), a combustion chamber delimited on one side by the upper face of piston (22) comprising a teat (30) pointing towards cylinder head (12) and arranged in a concave bowl (28), and intake means (14, 16) for at least one gaseous fluid, said intake means being designed so as to admit the gaseous fluid into the combustion chamber with a swirling motion or swirl.

According to the invention, the fuel is injected with an injection nozzle (24) having a nappe angle ($a_1$) less than or equal to $$2 Arctg \frac{CD}{2F},$$

where CD is the diameter of cylinder (10) and F the distance between the point of origin of the fuel jets from injection nozzle (24) and the position of the piston corresponding to a crankshaft angle of 50° in relation to the top dead center (TDC), and the gaseous fluid is injected with a swirl ratio less than or equal to 1.7.

12 Claims, 3 Drawing Sheets

METHOD AND ENGINE PROVIDING MIXING OF AT LEAST ONE GASEOUS FLUID SUCH AS AIR AND OF A FUEL IN THE COMBUSTION CHAMBER OF A DIRECT-INJECTION INTERNAL-COMBUSTION ENGINE

FIELD OF THE INVENTION

The present invention relates to a method intended to provide mixing of at least one gaseous fluid such as air and of a fuel in the combustion chamber of a direct-injection internal-combustion engine, notably of Diesel type.

The invention also relates to an internal-combustion engine using such a method.

BACKGROUND OF THE INVENTION

It is already well-known in conventional-combustion Diesel engines to use a particular intake for the gaseous fluid, such as air or a mixture of recirculated exhaust gas and air, so as to favour mixing of this fluid and of the fuel injected.

Some of the known methods for favouring this mixing consist in transmitting a swirling motion to the gaseous fluid, i.e. a rotating motion around an axis that is substantially parallel to or merges with the axis of the combustion chamber, either after its intake in the combustion chamber or as it enters the combustion chamber so that the gaseous fluid mixes by <<swirling>> with the fuel injected in form of fine droplets.

This swirling motion of the gaseous fluid can be created by at least one intake manifold arranged tangentially and radially to the combustion chamber, and referred to as tangential manifold. The gaseous fluid thus flows in along the wall of the cylinder and it generates a swirling motion around the principal axis of the combustion chamber. It can also be created by at least one manifold of helical shape, referred to as helical manifold, which is designed in such a way that the gaseous fluid already has a swirling motion as it enters this combustion chamber. It is also possible to associate at least one tangential manifold with at least one helical manifold to generate this swirling motion.

This swirling motion of the gaseous fluid is known to the man skilled in the art as swirl and it is characterized by a ratio equal to $N_D/N$, where $N_D$ is evaluated by integration on the path of the piston, during the intake stroke, of the rotation of the elementary feed introduced by taking account of the valve lift and of the piston speed, followed by division by the total amount of air (or of gaseous fluid) introduced, N being the engine speed.

This swirl affords the advantage of improving mixing of the gaseous fluid with the fuel while decreasing emissions such as fumes. It is more particularly of interest under low-speed and low-load running conditions of the engine when the internal aerodynamics of the combustion chamber is insufficient to provide mixing of the gaseous fluid with the fuel.

However, if too high a swirl ratio is used, it has the non insignificant drawback of diverting circumferentially the fuel jets in vapour phase from the injection nozzle and of leading to a configuration where the fuel jets are superposed on one another, which is harmful as regards fumes discharge.

Thus, in conventional-combustion Diesel engines, there is a compromise, for each working point, between the maximum swirl ratio allowing to limit emissions at partial load and a swirl ratio compatible with the injection characteristics, such as the nappe angle of the fuel jets, the diameter of the injection nozzle ports, the number of ports of this nozzle, the fuel injection pressure, so as to prevent the fuel jets from superposing on one another at high loads. Generally, a rather high swirl above 3 is always selected.

In the case of Diesel engines working under homogeneous combustion conditions, it is a more or less homogeneous mixture of gaseous fluid and of fuel that self-ignites, and it is therefore important to favour mixing of the gaseous fluid and of the fuel.

In order to favour this homogeneous mixing, the fuel and the gaseous fluid are brought together at an early stage in the cycle. A high swirl ratio would theoretically be beneficial because of the swirling induced between the gaseous fluid and the fuel, but the fuel droplets may be thrown onto the walls of the cylinder and thus dilute in the oil.

This fuel ejection would not only lead to a degradation of the behaviour of the lubricant present on this wall and to the creation of soots with a risk of piston sticking in the cylinder, but also to an emissions increase and to a decrease in the engine performances.

SUMMARY OF THE INVENTION

The present invention is aimed to overcome the aforementioned drawbacks by means of a method and of an engine allowing to obtain better mixing of the gaseous fluid with the fuel injected in the combustion chamber while allowing homogeneous combustion at low load and conventional combustion at high load.

The invention thus relates to a method providing mixing of at least one gaseous fluid in the combustion chamber of a direct-injection internal-combustion engine comprising at least a cylinder, a cylinder head, a piston sliding in this cylinder, a fuel-injection nozzle, a combustion chamber delimited on one side by the upper face of the piston comprising a teat pointing towards the cylinder head and arranged in a concave bowl, and intake means for at least one gaseous fluid, said intake means being designed so as to admit the gaseous fluid into the combustion chamber with a swirling motion, characterized in that the fuel is injected with an injection nozzle having a nappe angle less than or equal to $$2 Arctg \frac{CD}{2F},$$

where CD is the diameter of the cylinder and F the distance between the point of origin of the fuel jets from the injection nozzle and the position of the piston corresponding to a crankshaft angle of 50° in relation to the top dead center (TDC), and the gaseous fluid is injected with a swirl ratio less than or equal to 1.7.

The gaseous fluid can be injected with a swirling motion coaxial to that of the bowl.

The fuel can be injected with a nappe angle less than or equal to 120°.

The fuel can be injected with a nappe angle ranging between 40° and 100°.

It is possible to use a piston with a teat such that the angle at the vertex of said teat is substantially in accordance with the nappe angle of the injection nozzle and a bowl whose wall is shaped in such a way that the injected fuel is guided towards the outside thereof and vaporized without reaching the walls of said cylinder, for any position of the piston up to ±30° in relation to the top dead center (TDC).

The invention also relates to an internal-combustion engine comprising at least a cylinder, a cylinder head, a piston sliding in this cylinder, a fuel-injection nozzle, a combustion chamber delimited on one side by the upper face of the piston comprising a teat pointing towards the cylinder head and arranged in a concave bowl, intake means for at least one gaseous fluid, said intake means being designed so as to admit the gaseous fluid into the combustion chamber with a swirling motion, characterized in that this engine comprises at least one injection nozzle for injecting fuel with a nappe angle less than or equal to $$2 Arctg \frac{CD}{2F},$$

where CD is the diameter of the cylinder and F the distance between the point of origin of the fuel jets from the injection nozzle and the position of the piston corresponding to a crankshaft angle of 50° in relation to the top dead center (TDC), and the intake means are designed to admit the gaseous fluid into the combustion chamber with a swirl ratio less than or equal to 1.7.

The intake means can comprise at least one intake manifold designed to admit the gaseous fluid with a swirl ratio less than or equal to 1.7.

The intake means can comprise throttle means and the engine can comprise at least one control means for actuating the throttle means so as to obtain a swirl ratio less than or equal to 1.7.

The nappe angle of the injection nozzle can be selected between 0° and 120°.

The nappe angle of the injection nozzle can be selected between 40° and 100°.

The angle at the vertex of the teat is selected greater than the nappe angle by a value ranging between 0° and 30°.

The bowl can have an inclined lateral wall and the angle of inclination of the wall is less than 45°.

BRIEF DESCRIPTION OF THE FIGURES

Other features and advantages of the invention will be clear from reading the description hereafter, given by way of non limitative example, with reference to the accompanying drawings wherein.

DETAILED DESCRIPTION

Figure 1:
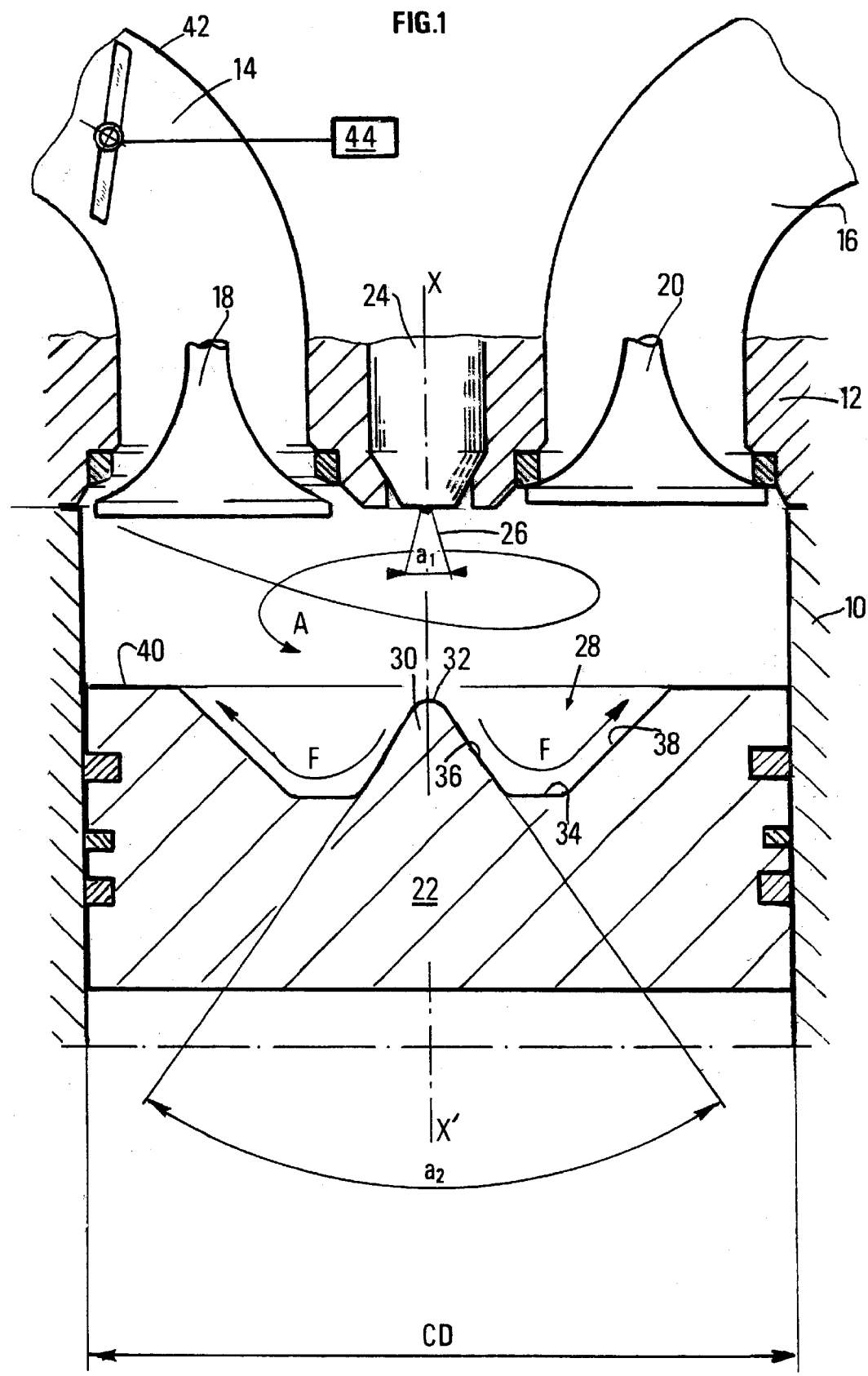
FIG. 1 diagrammatically shows an internal-combustion engine using the method according to the invention.

With reference to FIG. 1, an internal-combustion engine of Diesel type comprises at least a cylinder 10 of axis XX', a cylinder head 12, at least one intake manifold 14 for a gaseous fluid such as air or a mixture of recirculated gas (EGR) and air, at least one exhaust manifold 16, closing and opening of the manifolds being controlled by a means such as an intake valve 18 and an exhaust valve 20 respectively, a piston 22 sliding in cylinder 10 and a multijet fuel-injection nozzle 24 preferably arranged in line with axis XX' of the cylinder, from which fuel jets 26 are injected.

The fuel-injection nozzle is of the type with a small nappe angle $a_1$ and it is so selected that the walls of the cylinder are never wetted by the fuel for any position of the piston ranging between +50° and +α or between −50° and −α, where α represents the crankshaft angle for the injection phase selected in relation to the top dead center (TDC), this angle α being greater than 50° and less than or equal to 180° to obtain a homogeneous type combustion.

If CD represents the diameter of cylinder 10 (in mm) and F the distance (in mm) between the point of origin of the jets from injection nozzle 24 and the position of the piston corresponding to a crankshaft angle of 50°, nappe angle $a_1$ (in degrees) will be less than or equal to $$2 Arctg \frac{CD}{2F}.$$

A typical angle range for nappe angle $a_1$ is at the most 120° and it preferably ranges between 40° and 100°.

The combustion chamber is delimited by the inner face of cylinder head 12, the circular wall of cylinder 10 and the upper face of piston 22.

This upper face of the piston comprises a concave bowl 28 inside which is arranged a teat 30 that points towards cylinder head 12 and is arranged at the center of this bowl.

In the example shown, the general axis of bowl 28, the axis of injection nozzle 24 and the axis of teat 30 merge with axis XX' of the cylinder but, of course, the axes of the bowl, of the injection nozzle and of the teat may not be coaxial to that of the cylinder. It is however important to have an arrangement such that the axis of the fuel jet nappe 26 from injection nozzle 24, the axis of teat 30 and the axis of bowl 28 are substantially coaxial.

The generally truncated teat 30 comprises a preferably rounded vertex 32 extended, in the direction of the bottom 34 of the bowl, by a substantially rectilinear inclined flank 36, then, from bowl bottom 34, by a substantially rectilinear inclined lateral wall 38 that joins a substantially horizontal surface 40 of the upper face of piston 22.

Angle $a_2$ at the vertex of teat 30 and the angle of inclination of lateral wall 38 of bowl 28 are substantially suited to the nappe angle of injection nozzle 24 so that, under conventional combustion conditions with fuel injection close to the combustion top dead center (cTDC), the fuel is injected substantially along flank 36 of the teat, then it flows back along lateral wall 38 of the bowl as shown by arrows F in FIG. 1. Advantageously, angle $a_2$ at the vertex of the teat is selected so as to be greater than nappe angle $a_1$ of the fuel jets by a value ranging between 0° and 30°, and the angle of inclination of lateral wall 38 of bowl 28 is less than 45°.

The combustion chamber is suited to receive, through intake manifold 14, at least one gaseous fluid such as outside air or a mixture of recirculated exhaust (EGR) and air, so that this fluid is fed into this chamber while creating a swirling motion inside the chamber, as shown by arrow A in FIG. 1.

In the example of FIG. 1, the swirling motion of the gaseous fluid has an axis substantially coaxial to axis XX' of the cylinder and it is generated by the tangential arrangement of manifold 14, i.e. the general direction of this manifold, projected on a plane substantially perpendicular to axis XX', is substantially tangential to the wall of cylinder 10.

Of course, a helical arrangement of manifold 14 is also possible for this swirl, this arrangement consisting in the manifold extending spirally around its general axis which is mainly vertical. Several manifolds are also possible, as well as combinations of at least one helical manifold with at least one tangential manifold.

Thus, to mix the gaseous fluid and the fuel, the manifold is designed to inject the gaseous fluid into the combustion chamber with a swirl ratio less than or equal to 1.7 when intake valve 18 is open.

In another configuration, this intake manifold is equipped with throttle means such as a butterfly valve 42 whose rotation is controlled by a control means 44 allowing to obtain a swirl ratio less than or equal to 1.7.

Thus, to mix the gaseous fluid and the fuel, intake valve 16 is open and opening of valve 42 is controlled by control means 44 such as an electric micromotor, so as to admit into the combustion chamber a gaseous fluid whose swirl ratio is less than or equal to 1.7.

In the conventional combustion mode, during the gaseous fluid intake, the fuel in form of jet nappes 26 of small nappe angle as described above is thrown onto teat 32 and more particularly along its flank 36. This fuel vaporizes in bowl 28 and mixes with the gaseous fluid as it flows along wall 38 towards the bowl outlet.

If a high swirl ratio is used for the gaseous fluid, a sort of a plug is created at the bowl outlet, which forms an obstacle and hinders or even prevents the vaporized fuel from leaving the bowl.

In fact, the tangential velocities of the gaseous fluid exceed the substantially axial velocities of the vaporized fuel and, consequently, the fuel is prevented from flowing back along the wall of the bowl by the swirling gaseous fluid, all the more so as the velocity of the jets is low.

It is important for the fuel to be able to flow out of the bowl because, if it remains trapped in it, part of the air (or of the gaseous fluid) in the vicinity of surface 40 of piston 22 is not used.

Therefore, part of the fuel is not mixed with the gaseous fluid, which reduces on the one hand the maximum fuel-air ratio possibilities and, on the other hand, makes the resulting combustion imperfect, which produces unburnt hydrocarbons and fumes, and a decrease in the engine performance.

When using a low swirl ratio, as mentioned above, the vaporized fuel can leave the bowl because the axial velocity of the gaseous fluid is lower than that of the vaporized fuel. Besides, this fuel can readily mix with the gaseous fluid because the circumferential velocity of this fluid is such that it allows swirling of the fuel and the gaseous fluid. Thus, the full-load performance of the engine in conventional combustion mode is not altered by this swirl ratio.

The combined use of the injection nozzle with a relatively small nappe angle and of a low swirl ratio admits of a conventional running mode for a fuel injection close to the top dead center, but in a larger angle range than that commonly allowed, without penalizing mixing of the fuel with the gaseous fluid.

Furthermore, it allows to avoid the presence of liquid fuel on the cylinder walls while affording great pollution control and engine performance possibilities.

At full load and at high loads, the engine allows good carry-over of the vaporized fuel, thus favouring its mixing with the gaseous fluid so as to obtain a good combustion rate and great mixture strengths indicating a good use of the gaseous fluid admitted and of the fuel injected.

Figure 2:
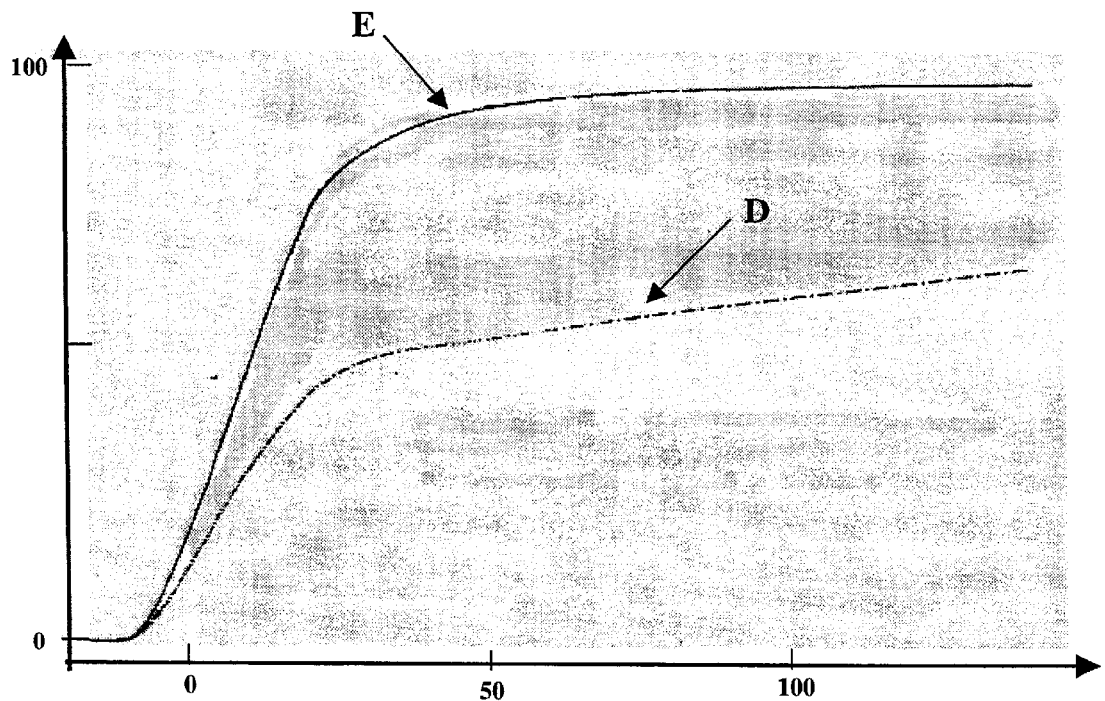
FIG. 2 is a graph showing the evolution of the burnt fraction in the combustion chamber for different swirl ratios at high load.

By way of comparison, the applicant has carried out tests whose results are shown in FIG. 2.

In this figure, the ordinate indicates the amount of fuel fraction burnt (in %), and the abscissa shows the angular displacement of the crankshaft (in degrees) corresponding to the combustion stage of the fuel mixture in the combustion chamber of the engine at high load, this displacement being in accordance with the linear displacement of piston 22.

Curves D and E are representative of the burnt fraction of the fuel mixture respectively for a swirl ratio of 5 and for a swirl ratio of 1.5 of the gaseous fluid, outside air in the present case, admitted in this combustion chamber.

As can be seen in this graph, the burnt fraction of the fuel is larger for a fuel mixture resulting from a 1.5 swirl ratio (curve E).

This finds expression in an engine performance increase of the order of 10%.

Figure 4:
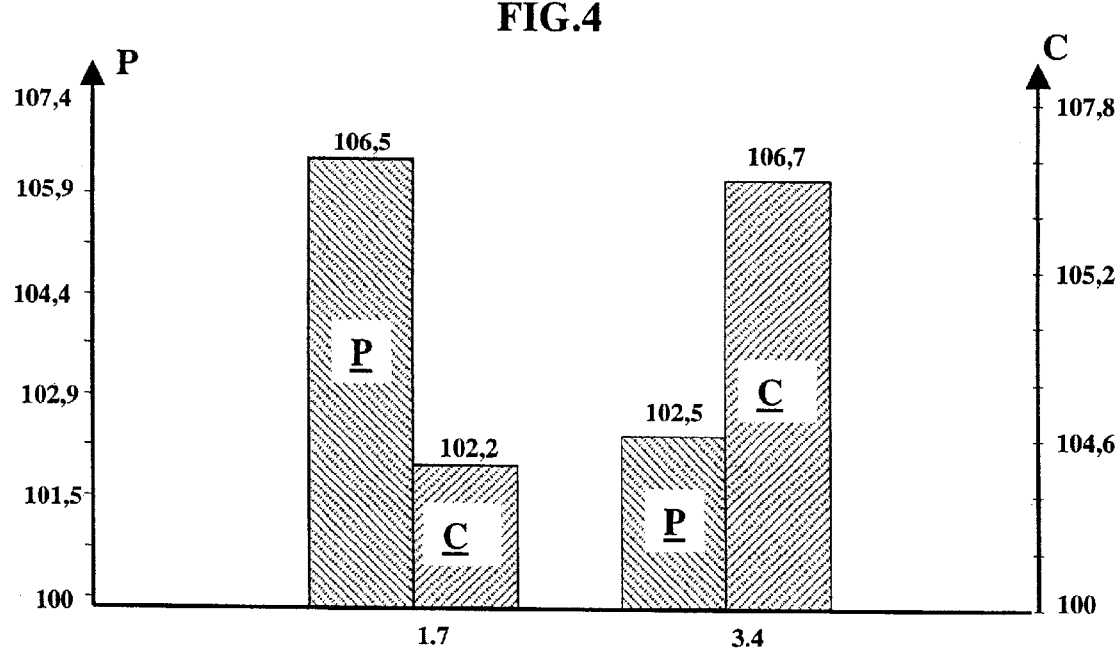
FIG. 4 is another graph showing the power and consumption gain of the engine for various swirl ratios on a high load point.
Figure 5:
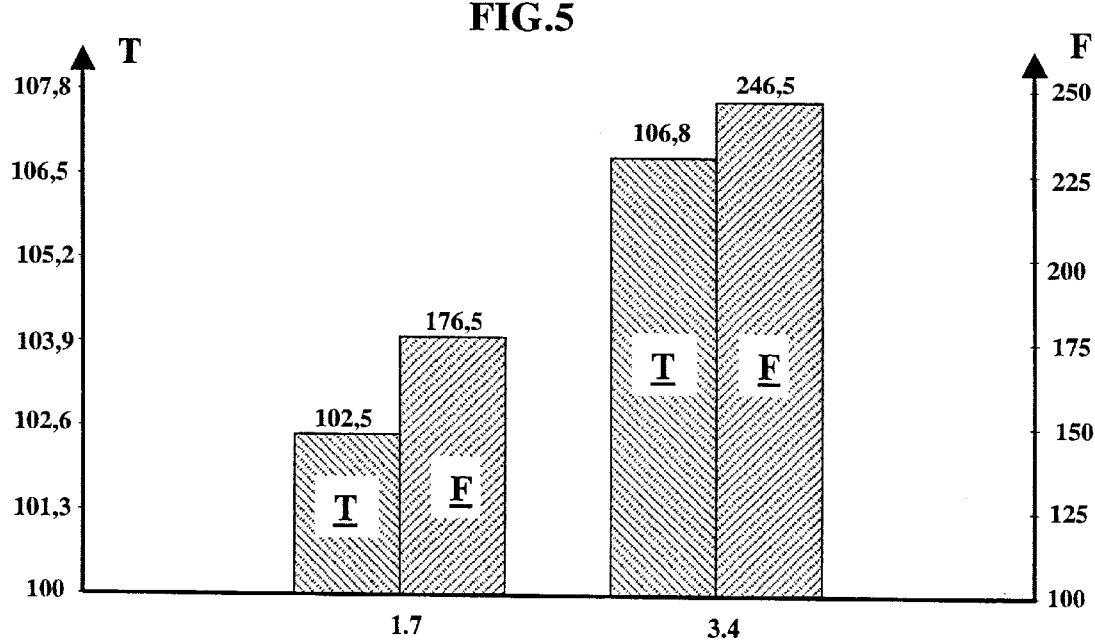
FIG. 5 is a graph showing the temperature of the exhaust gas and the amount of fumes for various swirl ratios on a high load point.

By way of example, the applicant has carried out a series of tests whose results are given in FIGS. 4 and 5.

For these tests, the applicant used a Diesel type direct-injection engine with a swirl ratio of 1.7 and 3.4.

According to the results shown in FIG. 4, in which the power P of the engine (in base 100) and its consumption C (in base 100) are laid off as ordinate and the swirl ratios are laid off as abscissa, the consumption has decreased by approximately 5% and the power has increased by about 4% with an engine running with a swirl ratio of 1.7 in relation to the same engine running with a swirl ratio of 3.4.

According to FIG. 5, where the temperature T of the exhaust gas (in base 100) and the fumes content F (in base 100) are laid off as ordinate and the swirl ratios are laid off as abscissa, the results of these tests show that the temperature of the exhaust gas has decreased by approximately 4% and the discharge of fumes has decreased by about 30% for an engine running with a swirl ratio of 1.7 in relation to an engine with a swirl ratio of 3.4.

In the case of this Diesel engine running in homogeneous combustion mode, it is a more or less homogeneous mixture of gaseous fluid and fuel that self-ignites and it is therefore important to favour mixing of the gaseous fluid and of the fuel.

In order to promote this homogeneous mixture, the fuel and the gaseous fluid are brought together by injections at early stages in the cycle. A high swirl ratio would theoretically be beneficial because of the swirling caused between the gaseous fluid and the fuel, but the fuel droplets can be thrown onto the cylinder wall and thus dilute in the oil, which leads to the aforementioned drawbacks.

At partial loads, a reduced nappe angle associated with a low swirl ratio affords considerable latitude for adjusting the injection system without the drawbacks linked with wetting of the cylinder walls and while providing mixing of the fuel with the gaseous mixture. In general, the small nappe angle of the fuel jets provides a great adjustment latitude whereas a low swirl ratio generates a low degree of centrifugation of the fuel droplets.

Figure 3:
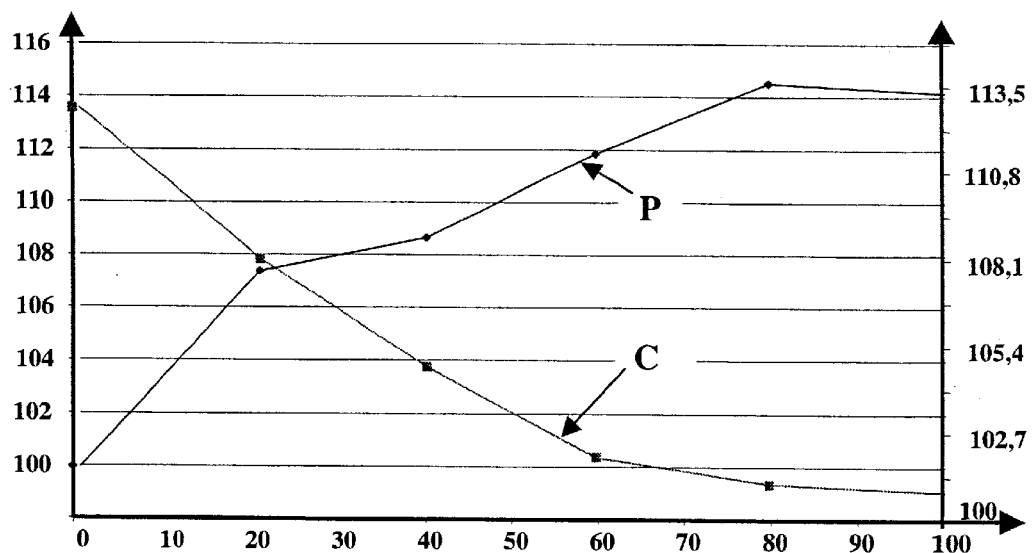
FIG. 3 is a graph showing the evolution of the performance and of the consumption of the engine as a function of the swirl ratio variation on a partial load point under homogeneous combustion conditions.

FIG. 3 is a graph wherein the power P of the engine (in base 100) and its consumption C (in base 100) are laid off as ordinate and the swirl ratios are laid off as abscissa for an engine running on a partial load point under homogeneous combustion conditions. These swirl ratios were obtained by using an engine comprising a helical intake manifold and a tangential intake manifold, one of the two manifolds being equipped with a throttle means, here a butterfly valve 42 as described above. With a 100% opening of this valve (wide open position), a swirl ratio of the order of 1 is obtained and, with a 0% opening of this valve (fully closed position), the swirl ratio is of the order of 3.

Reading of this graph shows that the consumption remains substantially constant for a displacement of the butterfly valve from 100% to 65%, which corresponds to a swirl ratio of about 1 up to 1.7, and it increases in a not insignificant way from this value. The engine power remains substantially maximum for a swirl ratio of 1 to about 1.7, then it suddenly drops above this value.

It can thus be observed that a swirl ratio less than or equal to 1.7 allows to obtain a combustion providing a maximum engine power while limiting the fuel consumption and in particular the fuel dilution.

It can be noticed that the use of a low swirl ratio allows to use a high-permeability cylinder head.

The present invention is not limited to the example described and it includes any variant.

What is claimed is:

1. A method providing mixing of at least one gaseous fluid in the combustion chamber of a direct-injection internal-combustion engine comprising at least a cylinder (10), a cylinder head (12), a piston (22) sliding in this cylinder, a fuel-injection nozzle (24), a combustion chamber delimited on one side by the upper face of piston (22) comprising a teat (30) pointing towards cylinder head (12) and arranged in a concave bowl (28), and intake means (14, 18) for at least one gaseous fluid, said intake means being designed so as to admit the gaseous fluid into the combustion chamber with a swirling motion or swirl, characterized in that the fuel is injected with an injection nozzle (24) having a nappe angle ($a_1$) less than or equal to $$2 Arctg \frac{CD}{2F},$$

where CD is the diameter of cylinder (10) and F the distance between the point of origin of the fuel jets from injection nozzle (24) and the position of the piston corresponding to a crankshaft angle of 50° in relation to the top dead center (TDC), and the gaseous fluid is injected with a swirl ratio less than or equal to 1.7.

2. A method as claimed in claim 1, characterized in that the gaseous fluid is injected with a swirling motion or swirl coaxial to that of bowl (28).

3. A method as claimed in claim 1, characterized in that the fuel is injected with a nappe angle ($a_1$) less than or equal to 120°.

4. A method as claimed in claim 3, characterized in that the fuel is injected with a nappe angle ($a_1$) ranging between 40° and 100°.

5. A method as claimed in claim 1, characterized in that it uses a piston (22) with a teat (30) such that the angle at the vertex of said teat ($a_2$) is substantially in accordance with the nappe angle ($a_1$) of injection nozzle (24) and a bowl (28) whose wall (38) is shaped in such a way that the injected fuel is guided towards the outside thereof and vaporized without reaching the walls of said cylinder, for any position of the piston up to ±30° in relation to the top dead center (TDC).

6. An internal-combustion engine comprising at least a cylinder (10), a cylinder head (12), a piston (22) sliding in this cylinder, a fuel-injection nozzle (24), a combustion chamber delimited on one side by the upper face of piston (22) comprising a teat (30) pointing towards cylinder head (12) and arranged in a concave bowl (28), and intake means (14, 16) for at least one gaseous fluid, said intake means (14, 18) being designed so as to admit the gaseous fluid into the combustion chamber with a swirling motion or swirl, characterized in that this engine comprises at least one injection nozzle (24) for injecting fuel with a nappe angle ($a_1$) less than or equal to $$2 Arctg \frac{CD}{2F},$$

where CD is the diameter of cylinder (10) and F the distance between the point of origin of the fuel jets from injection nozzle (24) and the position of the piston corresponding to a crankshaft angle of 50° in relation to the top dead center (TDC), and in that intake means (14, 16) are designed to admit the gaseous fluid into the combustion chamber with a swirl ratio less than or equal to 1.7.

7. An engine as claimed in claim 6, characterized in that the intake means comprise at least one intake manifold designed to admit the gaseous fluid with a swirl ratio less than or equal to 1.7.

8. An engine as claimed in claim 6 wherein the intake means comprise a throttle means (42), characterized in that it comprises at least one control means (44) for actuating throttle means (42) so as to obtain a swirl ratio less than or equal to 1.7.

9. An engine as claimed in claim 6, characterized in that nappe angle ($a_1$) of injection nozzle (24) is selected between 1° and 120°.

10. An engine as claimed in claim 9, characterized in that nappe angle ($a_1$) of injection nozzle (24) is selected between 40° and 100°.

11. An engine as claimed in claim 6, characterized in that angle ($a_2$) at the vertex of teat (30) is selected greater than nappe angle ($a_1$) by a value ranging between 0° and 30°.

12. An engine as claimed in claim 6 wherein the bowl comprises an inclined lateral wall (38), characterized in that the angle of inclination of wall (38) is less than 45°.

* * * * *